United States Patent
Hiraga et al.

(10) Patent No.: US 9,275,474 B2
(45) Date of Patent: *Mar. 1, 2016

(54) PARTIAL EXPANSION METHOD OF ENCODED IMAGES AND IMAGE PROCESSING APPARATUS

(71) Applicant: Morpho, Inc., Tokyo (JP)

(72) Inventors: Masaki Hiraga, Tokyo (JP); Kunihiro Naka, Tokyo (JP); Takayuki Nishiyama, Tokyo (JP); Takeshi Miura, Tokyo (JP); Katsuhiro Nakayama, Tokyo (JP)

(73) Assignee: Morpho, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,388

(22) Filed: Jul. 29, 2013

(65) Prior Publication Data

US 2014/0029861 A1 Jan. 30, 2014

Related U.S. Application Data

(63) Continuation of application No. 12/925,678, filed on Oct. 27, 2010, now Pat. No. 8,532,406.

(30) Foreign Application Priority Data

Mar. 4, 2010 (JP) ................. 2010-048478

(51) Int. Cl.
| | |
|---|---|
| G06K 9/36 | (2006.01) |
| G06T 9/00 | (2006.01) |
| H04N 19/176 | (2014.01) |
| H04N 19/70 | (2014.01) |
| H04N 19/46 | (2014.01) |
| H04N 19/60 | (2014.01) |
| H04N 19/17 | (2014.01) |
| H04N 19/59 | (2014.01) |

(52) U.S. Cl.
CPC *G06T 9/00* (2013.01); *H04N 19/17* (2014.11); *H04N 19/176* (2014.11); *H04N 19/46* (2014.11); *H04N 19/59* (2014.11); *H04N 19/60* (2014.11); *H04N 19/70* (2014.11)

(58) Field of Classification Search
None
See application file for complete search history.

(56) References Cited

U.S. PATENT DOCUMENTS 5,347,600 A * 9/1994 Barnsley et al. ............... 382/249
6,466,624 B1 * 10/2002 Fogg ......................... 375/240.27
(Continued)

FOREIGN PATENT DOCUMENTS

JP        3108283        9/2000
JP        2000-278685    10/2000
(Continued)

OTHER PUBLICATIONS

Agarwal, Gaurav, Alwin Anbu, and Aniruddha Sinha. "A fast algorithm to find the region-of-interest in the compressed MPEG domain." Multimedia and Expo, 2003. ICME'03. Proceedings. 2003 International Conference on. vol. 2. IEEE, 2003.*

Office action issued by European Patent Office for the counterpart European patent application.

*Primary Examiner* — Stephen R Koziol
*Assistant Examiner* — Amandeep Saini
(74) *Attorney, Agent, or Firm* — Jianq Chyun IP Office

(57) ABSTRACT

A method and apparatus for partially up/downscaling an image encoded on a macroblock basis. The method and apparatus performs operations of: storing the encoded image; creating map data from bitstream of the encoded image to decode at least one macroblock of the encoded image, creating a shrunken image of a predetermined size based on resolution of a display device, storing the map data and the shrunken image so as to relate with the encoded image; outputting the shrunken image related with the encoded image to be displayed based on a control request received from an input device; determining at least one macroblock to be decoded based on a display area of the shrunken image; partially decoding the encoded image for the determined macroblock using the map data; and outputting to the display device, the image data of the display area of the partially decoded image.

20 Claims, 20 Drawing Sheets

(56) References Cited

U.S. PATENT DOCUMENTS

| | | | |
|---|---|---|---|
| 6,970,642 B1* | 11/2005 | Kutaragi | 386/328 |
| 2005/0069040 A1* | 3/2005 | Francois et al. | 375/240.27 |
| 2006/0215765 A1 | 9/2006 | Hwang et al. | |
| 2008/0199091 A1 | 8/2008 | Srinivasan et al. | |

FOREIGN PATENT DOCUMENTS

| | | |
|---|---|---|
| JP | 3399743 | 2/2003 |
| JP | 374914 | 12/2005 |
| JP | 2006-262496 | 9/2006 |
| JP | 2007-335933 | 2/2007 |

* cited by examiner

FIG. 2

EXAMPLE OF MACROBLOCK DIVISION OF ONE IMAGE DATA

| MB00 | MB01 | MB02 | MB03 | MB04 | MB05 | MB06 | MB07 |
|------|------|------|------|------|------|------|------|
| MB08 | MB09 | MB10 | MB11 | MB12 | MB13 | MB14 | MB15 |
| MB16 | MB17 | MB18 | MB19 | MB20 | MB21 | MB22 | MB23 |
| MB24 | MB25 | MB26 | MB27 | MB28 | MB29 | MB30 | MB31 |
| MB32 | MB33 | MB34 | MB35 | MB36 | MB37 | MB38 | MB39 |
| MB40 | MB41 | MB42 | MB43 | MB44 | MB45 | MB46 | MB47 |

FIG.3

| MACROBLOCK ID | FILESTREAM POSITION (BIT) | DC COMPONENT VALUE Y | DC COMPONENT VALUE U | DC COMPONENT VALUE V |
|---|---|---|---|---|
| MB00 | 1050 | 0 | 128 | 128 |
| MB01 | 1082 | 163 | 130 | 131 |
| MB02 | 1110 | 164 | 125 | 133 |
| : | : | : | : | : |
| MB47 | 2513 | 124 | 98 | 126 |

FIG.4

| MB00 | MB01 | MB02 | MB03 | MB04 | MB05 | MB06 | MB07 |
|------|------|------|------|------|------|------|------|
| MB08 | MB09 | MB10 | MB11 | MB12 | MB13 | MB14 | MB15 |
| MB16 | MB17 | MB18 | MB19 | MB20 | MB21 | MB22 | MB23 |
| MB24 | MB25 | MB26 | MB27 | MB28 | MB29 | MB30 | MB31 |
| MB32 | MB33 | MB34 | MB35 | MB36 | MB37 | MB38 | MB39 |
| MB40 | MB41 | MB42 | MB43 | MB44 | MB45 | MB46 | MB47 |

AREA TO BE DISPLAYED (DISPLAY AREA)

(SHADOW AREA INDICATES MACROBLOCKS TO BE DECODED)

FIG.5

| MACROBLOCK ID | FILESTREAM POSITION (BIT) | DC COMPONENT VALUE Y | DC COMPONENT VALUE U | DC COMPONENT VALUE V |
|---|---|---|---|---|
| MB00 | 1050 | 0 | 128 | 128 |
| MB05 | 1209 | 170 | 132 | 126 |
| MB10 | 1374 | 124 | 88 | 162 |
| .. | .. | | | |
| MB45 | 2451 | 96 | 191 | 203 |

FIG.6

| MB00 | MB01 | MB02 | MB03 | MB04 | MB05 | MB06 | MB07 |
| MB08 | MB09 | MB10 | MB11 | MB12 | MB13 | MB14 | MB15 |
| MB16 | MB17 | MB18 | MB19 | MB20 | MB21 | MB22 | MB23 |
| MB24 | MB25 | MB26 | MB27 | MB28 | MB29 | MB30 | MB31 |
| MB32 | MB33 | MB34 | MB35 | MB36 | MB37 | MB38 | MB39 |
| MB40 | MB41 | MB42 | MB43 | MB44 | MB45 | MB46 | MB47 |

AREA TO BE DISPLAYED (DISPLAY AREA)

(SHADOW AREAS INDICATE MACROBLOCKS TO BE DECODED)

FIG. 8

| SCAN ID | FILESTREAM POSITION OF SCAN HEADER (BYTE) | | | |
|---|---|---|---|---|
| SCAN0 | 86 | | | |
| SCAN1 | 573 | | | |
| ⋮ | ⋮ | | | |
| SCAN7 | 3720 | | | |
| MACROBLOCK ID/ SCAN ID | FILESTREAM POSITION OF MACROBLOCK (BIT) | DC COMPONENT Y | DC COMPONENT U | DC COMPONENT V |
| MB00/SCAN0 | 736 | 0 | 128 | 128 |
| MB00/SCAN1 | 4656 | — | — | — |
| ⋮ | ⋮ | ⋮ | ⋮ | ⋮ |
| MB00/SCAN7 | 29816 | — | — | — |
| MB05/SCAN0 | 790 | 170 | 132 | 126 |
| MB05/SCAN1 | 4703 | — | — | — |
| ⋮ | ⋮ | ⋮ | ⋮ | ⋮ |
| MB05/SCAN7 | 29872 | — | — | — |
| ⋮ | ⋮ | | | |
| MB45/SCAN0 | 4430 | 96 | 191 | 203 |
| MB45/SCAN1 | 7998 | — | — | — |
| ⋮ | ⋮ | ⋮ | ⋮ | ⋮ |
| MB45/SCAN7 | 30281 | — | — | — |

FIG.13

PRIORITY OF CACHE FILE DELETION

HIGH PRIORITY

- OUT OF PREDETERMINED RANGE FROM THE CURRENT IMAGE, AND OLD CACHE FILE CREATION TIMESTAMP
- OUT OF PREDETERMINED RANGE FROM THE CURRENT IMAGE, AND NEW CACHE FILE CREATION TIMESTAMP
- WITHIN PREDETERMINED RANGE FROM THE CURRENT IMAGE, AND FAR FROM THE CURRENT VIEWING IMAGE
- WITHIN PREDETERMINED RANGE FROM THE CURRENT IMAGE, AND NEAR TO THE CURRENT VIEWING IMAGE

LOW PRIORITY

PARTIALLY DECODED IMAGE DATA

PARTIAL EXPANSION METHOD OF ENCODED IMAGES AND IMAGE PROCESSING APPARATUS

This application is a continuation of U.S. patent application Ser. No. 12/925,678 filed Oct. 27, 2010, which claims the benefits of foreign filing priority based on Japanese Patent Application No. 2010-048478 filed Mar. 4, 2010, the entire contents of which are incorporated herein by reference.

BACKGROUND OF INVENTION

1. Field of Invention

The present invention relates to a technology that expands only a part of an encoded image data. Especially it relates to a partial expansion method of an encoded image and an image processing apparatus that decodes (i.e. expands) a part of the encoded image data, such as in JPEG format, and outputs the partially decoded image to a display device according to user control request regarding display area, up/downscaling, scrolling or the like.

2. Description of the Related Art

These days, large volume image data is becoming more common due to increased resolution of digital cameras and mobile phones with camera functionality. However, the resolution of the display device is usually lower than that of the data to be displayed.

For example, a display device to view image data is usually limited up to 0.5 megapixels (VGA)-2 megapixels (HDTV) in resolution. In this case, it is impossible to fully display the entire data of a 10 megapixel image of recent digital cameras. Therefore, as a viewing method, options are to shrink the image to view its entire image or not to shrink the image (or to shrink the image but not enough to fit the display device) and to view a part of the image. This image processing and image data storage requires significant volume of memory, but because of cost reduction needs and/or hardware restriction, its memory capacity is often restricted.

From these reasons, conventionally, several technologies to reduce memory to be used for image processing or image data storage have been proposed.

For example, Japanese Patent No. 3108283 proposes a partial up/downscaling apparatus that designates start position and end position of up/downscaling according to an RST table storing RST positions which are inserted into encoded JPEG data, reads data from the read starting sector located before the up/downscaling start position to the read ending sector located after the up/downscaling end position out of a storage medium, and up/downscales the data from up/downscaling start position to the up/downscaling end position.

Japanese Patent No. 3399743 proposes a technology that, in order to decode a large encoded image data using small volume of memory with smooth display and scrolling of partially decoded image, a regularly skipped encoded data offset values are recorded from the starting position of encoded image datastream while encoding image data or decoding encoded image data where the encoded data offset values are stored by predetermined intervals, if partial area within source image is selected appropriate encoded data offset values are read out, and encoded image data is partially decoded in the middle of the encoded datastream to perform scrolling.

Also, Japanese Unexamined Patent Application No. 2000-278685 describes a method in detail that partially expands a JPEG image using a scan table to partially expand the source image efficiently.

To create and display a partially decoded image data, certain amount of computational processing time is required. Therefore, Japanese Patent No. 3747914 proposes a technology where a preview image data with reduced resolution is created from a captured source image, and a thumbnail image with further reduced resolution of predetermined size is created, and the source image data are all stored together as an image data set in memory card, and one of the image data in the image data set is selected and displayed from the memory card when in display mode, and if there is no preview image data in the image data set then the source image data or thumbnail image data are displayed on the display device instead.

However, creating control data to partially expand an image and using the control data to partially expand the image require processing costs such as memory space and CPU load. For example, during the creation of control data, when a control request such as displaying an image, scrolling, zoom in, or zoom out is made by a user, responses to the user control request may be delayed due to the control data creation. Even though the speed of the partial decoding is faster than that of the entire decoding, the speed of processes such as scrolling may suffer due to such nature of partial decoding.

With the above circumstances taken into consideration, the object of the present invention is to provide to a partial expansion method of an encoded image and an image processing apparatus to reduce the CPU load of partial expansion processing, and to enable high quality image display while promptly responding to user control requests when displaying the partially decoded image.

SUMMARY OF THE INVENTION

Overview of encoded image partial expansion method of this invention is to make it possible to promptly display an encoded image, by creating an image to be fully displayed (hereinafter called "high-resolution shrunken image") and thumbnail images for visually-indexing multiple images (hereinafter called "low-resolution shrunken image"), by storing these images in a secondary memory (storage) in a file format when control data necessary for decoding the encoded image by blocks (hereinafter this control data is called "map data") is created, by storing only the necessary data from the above created data in a main memory when there is a control request from a user, and by effectively outputting on the display device, the high-resolution shrunken image, the low-resolution shrunken image, or the image partially decoded using map data, according to control request details of the user control request.

Below, data containing this map data, the high-resolution shrunken image, and the low-resolution shrunken image are called "cache data". Also, the cache data that is stored in a large capacity secondary memory such as flash memory in a file format is called "cache file".

The cache data can be created at any time during CPU idle time, during initial decoding of the encoded image, or during the encoding process when non-encoded image data is entered as its source image.

Normally, there are two image display modes. First is "individual display mode", which is to view an image by expanding/shrinking/scrolling, and second is "thumbnail index mode", which is to view multiple images in index mode in order to find a particular image. In this invention, the individual display mode utilizes both the high-resolution shrunken image and the cache data, and the thumbnail index mode only utilizes the low-resolution shrunken images.

Storing the low-resolution shrunken images in advance allows the prompt viewing since there is no need to read the source image whenever there is a display request from a user; however, depending on the image format, the low-resolution shrunken image may be already within the image file. For example, in JPEG data, there is a 160 by 120 pixel thumbnail image called Exif thumbnail, which is normally added at the time of capturing images using digital camera or mobile phone.

This Exif thumbnail used to show sufficient detail at the time resolutions of digital camera LCD screens were low; however, in order to display thumbnails on digital cameras and high definition televisions of these days, the Exif thumbnail size is often not large enough for the screen. Since the ideal size of shrunken image is dependent on the display device, readymade low-resolution shrunken image such as Exif thumbnail should not be used, but instead high-resolution shrunken image should be dynamically created during the viewing, for cache to be reused.

According to the individual display mode, it is possible to do the processing with reduced volume of memory by discarding unnecessary parts of the image while decoding an image from top left to bottom right. However, to display a certain part of an image, the image is often scrolled, and that requires the entire image to be decoded every time of the scrolling, and that degrades the performance and slows the user operation responses. According to this invention, a position within the image and its relative position in the image data filestream are scanned and stored in advance, and thereby, based on this information, the partial decoding can be done promptly.

<Map Data Structure>

Next, map data structure of this invention is described using JPEG as an example. JPEG data is a standard image encoding format where the source image is divided into units called macroblocks, and each macroblock is encoded to create the image data.

JPEG performs frequency conversion, quantization, and entropy encoding for each macroblock, and encodes each macroblock from the top left of the image to the bottom right in order. For example, in FIG. 2, the entire image is divided into 48 macroblocks of 8 by 6 pixels, and macroblocks MB00, MB01, . . . MB47 are encoded in order.

Encoded macroblock data exist in a bitstream order from the top left to the bottom right of the image displayed on a screen, and a DC component value of each macroblock is stored as the relative difference from the previous macroblock; therefore, to decode any macroblock, macroblocks from the start of the bitstream must be scanned in order. Therefore, the entire image must be decoded each time to decode one part of an image, which lowers the processing performance.

Therefore, in the present embodiment, processing speed is enhanced by scanning and storing map data containing image data filestream position and its relative internal image position, as well as the DC component values (each of YUV) for the macroblock.

FIG. 3 describes map data structure. Here, map data is related to a filestream position, a DC component value Y, a DC component value U, and a DC component value V for each macroblock ID.

According to JPEG, encoding is done for each bit by using entropy encoding; therefore, filestream position is designated on a bit basis.

When JPEG image partial decoding is performed, with reference to the map data, the file stream position is extracted for the macroblocks to be displayed. Then, the decoding process is performed from the position of the extracted file stream position for the prompt decoding. For example, if the solid-line bold-framed area is the display area to be shown on a display device, only the shaded macroblocks, which are included in the area, are extracted and decoded.

Creating map data for each macroblock makes the overall data volume too large; therefore, ideally the macroblocks should be skipped by a certain number to reduce data volume. FIG. 5 shows a map data structure where the filestream position is recorded every five macroblocks.

When the map data is created by skipping macroblocks, the macroblocks not stored in map data can be decoded by scanning based on the macroblocks recorded in the map data.

For example, to decode the bold-framed area in FIG. 6, the area surrounding the target macroblock will also be decoded. Thereby, the map data volume can be reduced, and further, it is possible to perform the decoding much faster than the case of decoding all the macroblocks.

<Case of Progressive JPEG Map Data>

There is a JPEG format called Progressive JPEG. The filestream thereof stores low-resolution data at its beginning part, and the data progressively increases in resolution further into the filestream. By using this method, when a file is transferred over a network, its low-resolution image is initially displayed after the beginning part of a filestream has been transferred, and as the file transfer continues more detailed data is displayed. In Progressive JPEG, the data group of each frequency band is called scan, and this data structure is described in FIG. 7. Here, scan 0 indicates the lowest resolution (YUV DC components), and as the scan ID increases higher resolution data are stored.

Each scan can contain header data, where the Huffman table for that scan is stored. This Huffman table is to be used for decoding Huffman code data.

Map data for Progressive JPEG stores a filestream position of scan header for each scan ID as indicated in FIG. 8, and the filestream position is stored for each macroblock scan ID. Here, scan 0 (DC components) of Progressive JPEG is the relative value compared to the previous MCU (Minimum Code Unit); therefore, Progressive JPEG map data stores a calculated cumulative value of DC components up to the current MCU of the filestream. This DC component values for each of the YUV do not exist for each scan, but exists for scan 0.

FIG. 8 shows an example, there are eight scans and 48 macroblocks (8 by 6) where every fifth macroblock data is stored by skipping the macroblocks inbetween.

What is different from the FIG. 5 map data is the addition of scan header of the filestream position, and macroblock filestream positions are stored for all the scans. This allows a prompt response of multiple position references within a file.

Map data for Progressive JPEG must store the filestream positions for multiple scans, which increases data volume. Depending on the amount of main memory, there may be a need to keep a map data size within a certain volume, and therefore a macroblock skipping interval needs to be adjusted to this effect. For example, if map data's upper limit data volume is Smap bytes, the number of scans is Nscan, storing scan filestream position takes Sscan byte per scan, the number of macroblocks is Nmb, storing macroblock filestream position takes Smb per macroblock, storing DC component value for each YUV takes Sdc bytes, then a macroblock skipping interval X can be obtained by the formula below.

(1)    $X=[Nmb\cdot(Smb\cdot Nscan+3\cdot Sdc)/(Smap-Nscan\cdot Sscan)]$

Here, [v] is the smallest integer that is greater than or equal to v.

Specifically, according to a first aspect of the present invention, a method for partially expanding an image encoded on a macroblock basis utilizing a computer, includes a step of storing the encoded image in a storage device of the computer; a step of creating map data from bitstream of the encoded image, the map data being utilized to decode at least one macroblock of the encoded image, creating a shrunken image of a predetermined size based on a screen resolution of a display device, and storing the map data and the shrunken image so as to relate the map data and the shrunken image with the encoded image in the storage device; a step of outputting, to the display device, the shrunken image related with the encoded image to be displayed based on a control request received from an input device; a step of determining at least one macroblock to be decoded based on a display area of the shrunken image; a step of partially decoding the encoded image for the determined macroblock using the map data; and a step of outputting to the display device, the image data of the display area of the partially decoded image.

Also, according to a second aspect of the present invention, an image processing apparatus includes a image data registration unit for storing, in a storage device, an encoded image having been encoded on a macroblock basis; a cache file creation unit for creating map data from bitstream of the encoded image, the map data being utilized to decode at least one of macroblock of the encoded image, creating a shrunken image of a predetermined size based on a screen resolution of a display device, and storing the map data and the shrunken image so as to relate the map data and the shrunken image with the encoded image in the storage device; a shrunken image output unit for outputting, to the display device, the shrunken image related with the encoded image to be displayed based on a control request received from an input device, a used block determination unit for determining at least one macroblock to be decoded based on a display area of the shrunken image; a partial decoding unit for partially decoding the encoded image for the determined macroblock using the map data; and a partially decoded image output unit for outputting to the display device, the image data of the display area of the partially decoded image created by the partial decoding unit.

According to the present invention, CPU processing costs are reduced by sharing a process that creates map data and also creates shrunken image that matches the screen size of a display device. Then, according to a user command (i.e. control request), display data created based on the shrunken image is output to a display device first, and then display data created based on the image data that is partially decoded using map data is output to the display device.

Also, used block determination unit of the image processing apparatus of the present invention adds macroblocks that are to be partially decoded using the partial decode unit based on the display area and a content of the control request.

The present invention not only determines macroblocks to decode from the current display area of the shrunken image, but predicts macroblocks to decode according to control request information regarding zoom-in, zoom-out, scroll direction, or the like.

Also, the partially decoded image output unit of the image processing apparatus of the present invention determines the existence of partially decoded image to be output to the display device, if such an image exists the shrunken image output unit process is terminated.

If all the partially-decoded image data (hereinafter, called "partially-decoded image data") exist, the image processing apparatus of the present invention prohibits outputting the shrunken image, and partially decoded image data is immediately output to the display, which reduces image quality fluctuations when a user inputs a control request, and realizes smooth controls of high quality display images such as scrolling.

Also, the image processing apparatus of the present invention comprises a partially decoded image deletion unit which deletes partially decoded image data on a macroblock basis according to user control request and displayed area.

The present invention allows efficient memory utilization by deleting partially decoded image data that have been regarded as having low possibility for usage according to display area and user control request information.

The present invention creates a shrunken image that fits to a display device screen size when map data is created, efficiently arranges the map data and partially-decoded image in main memory, which also reduces CPU load. Further, by first displaying the shrunken image before displaying partially-decoded image, it is possible to display a high quality image while promptly responding to the user control.

BRIEF DESCRIPTION OF THE DRAWINGS

FIG. 2 is an explanatory drawing of macroblocks used in JPEG data encode.

FIG. 3 is a sample map data structure of basic DCT format for JPEG.

FIG. 4 is an explanatory drawing showing relationship between macroblocks to be decoded and the display area.

FIG. 5 is another example of map data structure, where every fifth macroblock is stored.

FIG. 6 is an explanatory drawing showing relationship between macroblocks to be decoded and the display area for the FIG. 5 map data.

FIG. 8 is a sample of map data structure for Progressive JPEG.

FIG. 13 is a sample priority of cache data deletion process of cache file deletion unit 32 in FIG. 1.

DESCRIPTION OF THE PREFERRED EMBODIMENTS

Figure 1:
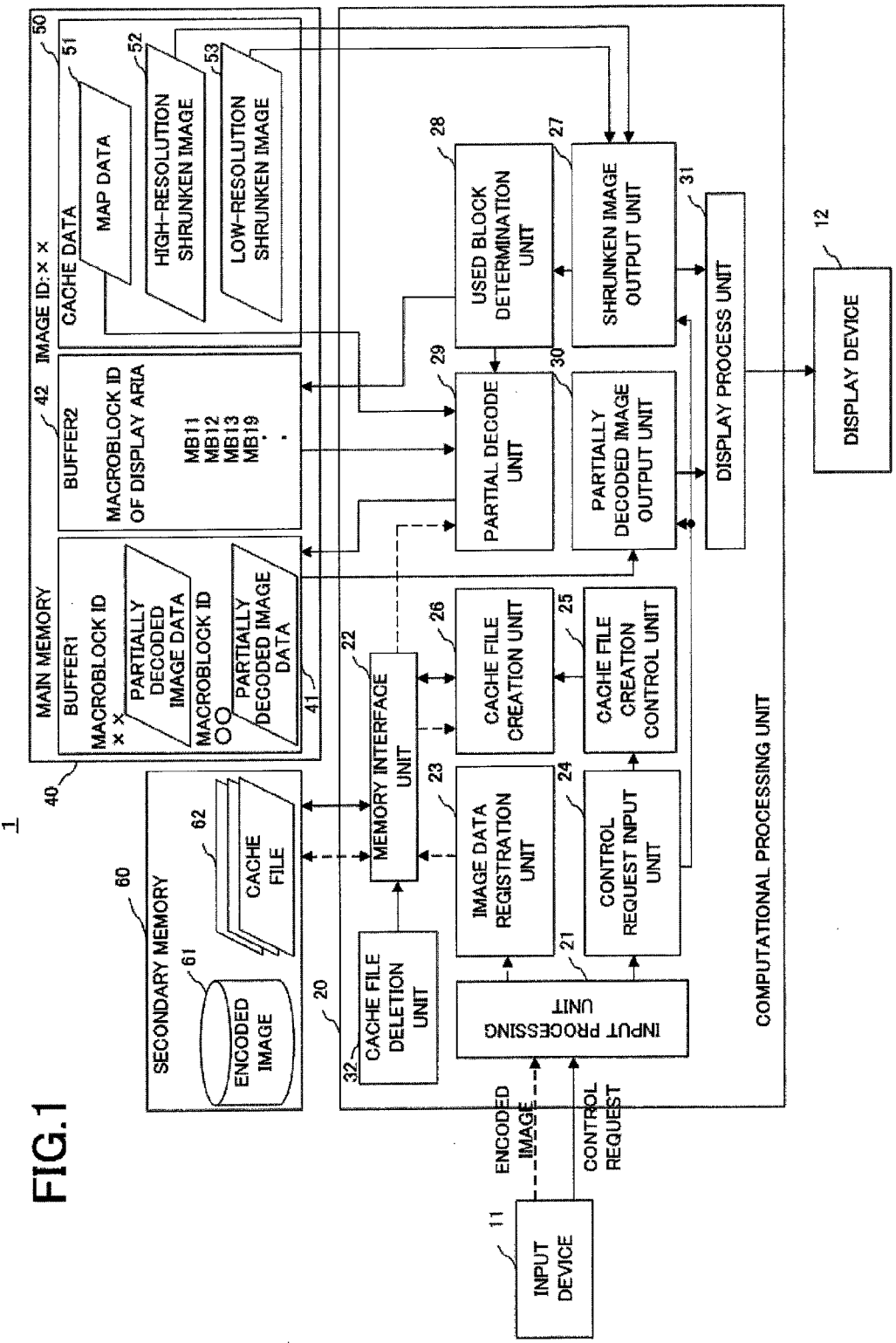
FIG. 1 is a functional block diagram of the image processing apparatus of the first embodiment of this invention.
Figure 7:
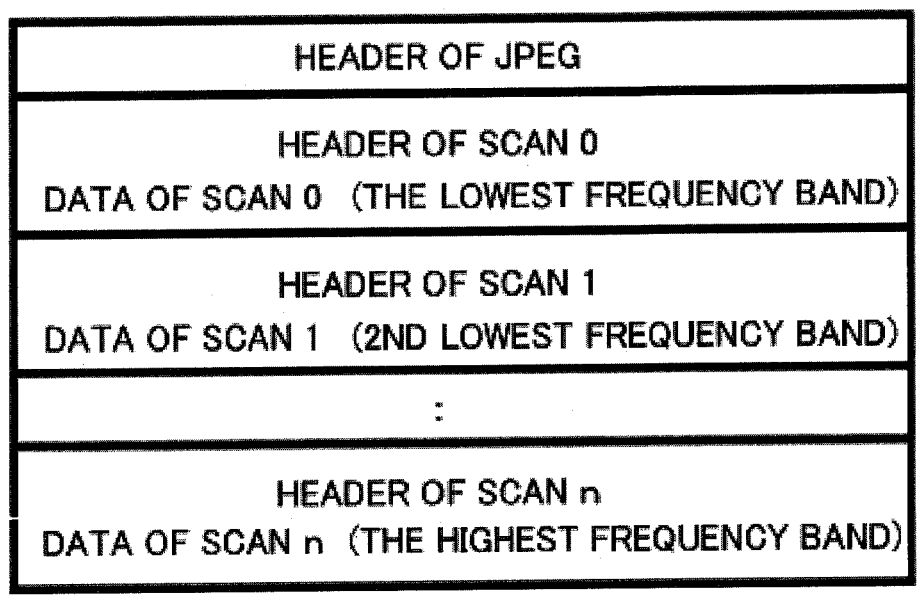
FIG. 7 is an explanatory drawing of Progressive JPEG data structure.

Below is the description of an embodiment of the present invention. FIG. 1 is a block diagram of the image processing apparatus to realize the partial image expansion method of the first embodiment. Image processing apparatus 1 contains input device 11 to input image data and user control requests, computational processing unit 20 to perform computational processing on input data by using the CPU, display device 12 to display processing results for images, etc., main memory 40 to write to directly from CPU, and secondary memory 60 which consists of large capacity memory such as flash memory. Alternatively, input device 11 can comprise imaging unit such as a camera, and an image captured by the imaging unit can be passed to computational processing unit 20.

This image processing apparatus 1 can be realized with a general computer such as a personal computer or a mobile phone with camera as long as the above-mentioned functionalities are satisfied.

Computational processing unit 20 contains input processing unit 21 to process input data passed from input device 11, memory interface unit 22 to write and read secondary memory 60 (hereinafter, called "memory I/F unit"), image data recording (registration) unit 23 to store image data in secondary memory 60 via memory interface unit 22, control request input unit 24 to accept user control requests such as to display and to scroll, cache file creation control unit 25 to control cache file creation timing, cache file creation unit 26 to create cache file, shrunken image output unit 27 to select and display low-resolution shrunken image 53 or high-resolution shrunken image 52 according to a control request from a user, used block determination unit 28 to identify macroblocks to decode in the encoded image, partial decode unit 29 to decode macroblocks that have been identified for decoding, partially decoded image output unit 30 to output partially decoded image to display device, and display process unit 31 executes display process for display device 12. In FIG. 1, encoded image data flows are indicated with broken line arrows, and the other data flows are indicated with solid line arrows.

Next, the operation of image processing apparatus 1 with the above structure is described.

<Encoded Image Data Input Process>

Computational processing unit 20 of image processing apparatus 1 receives encoded image data from input device 11 via input process unit 21, which is passed to image data registration unit 23. Image data registration unit stores image data as a file in encoded image database 61 of secondary memory 60 via memory interface unit 22. ID indicating input order (hereinafter called "image ID") and input timestamp are attached to the image file.

FIG. 1 does not include description for creating encoded image from non-encoded image; however, this feature can be included according to necessity. In this embodiment, the description is made under the assumption that non-encoded image will be input directly.

<Cache File Creation Process>

Next, cache file creation process steps performed by cache file creation control unit 25 and cache file creation unit 26 are described.

Cache file creation control unit 25 activates cache file creation unit 26 during CPU idle time when user is not operating the viewing software. Cache file creation control unit 25 checks whether the image cache file exists in secondary memory 60 to display upon receiving user control request (such as zoom in, zoom out, or scroll) from control request input unit 24, and if there is no cache file corresponding to the image to display, activate cache file creation unit 26 even when there is user control request.

When cache file creation unit 26 is activated, shrunken image and map data 51 are created to make the image viewing experience smooth. Two types of shrunken images are created, one is the relatively high-resolution shrunken image 52 for individually displaying an image, and another is the low-resolution shrunken image 53 (also known as thumbnail image) to be used for viewing indices of multiple images shown on a single screen. The size of high-resolution shrunken image 52 depends on the display size of display device 12 (namely, screen resolution of the display device). That is, high resolution shrunken image is created in a resolution (such as 1024 by 768 pixels) that matches input resolution information (such as XGA mode) of the display device parameter of image processing apparatus 1.

It is preferable, since it is possible to do the prompt creation, that first the high-resolution shrunken image 52 is created from the source image, and then low-resolution shrunken image 53 is created using high-resolution shrunken image 52, rather than creating both the high-resolution shrunken image 52 and low-resolution shrunken image 53 directly from the source image.

Creation of map data 51 requires scanning of the entire encoded image to extract scan positions and to perform cumulative calculation of DC components. On one hand, the entire encoded image must be scanned to create a high-resolution shrunken image. High-resolution shrunken image creation and map data creation require certain processing costs; therefore, it is preferable to reduce this processing cost by simultaneously creating both the high-resolution shrunken image 52 and map data 51.

Cache file creation unit 26 creates each of map data 51, high-resolution shrunken image 52, and low-resolution shrunken image 53, this cache data is stored in secondary memory 60 by associating it with the image ID of relevant image file.

Further, when the image is output and displayed where cache data is not yet created, cache data creation unit 26 creates cache data 50, displays the image using the cache data, then outputs the cache data 50 to cache file 62 of secondary memory 60. This allows prompt image display, with user operability improved. Creation process flow of cache data 50 and cache file 62 is indicated in FIG. 9.

Figure 9:
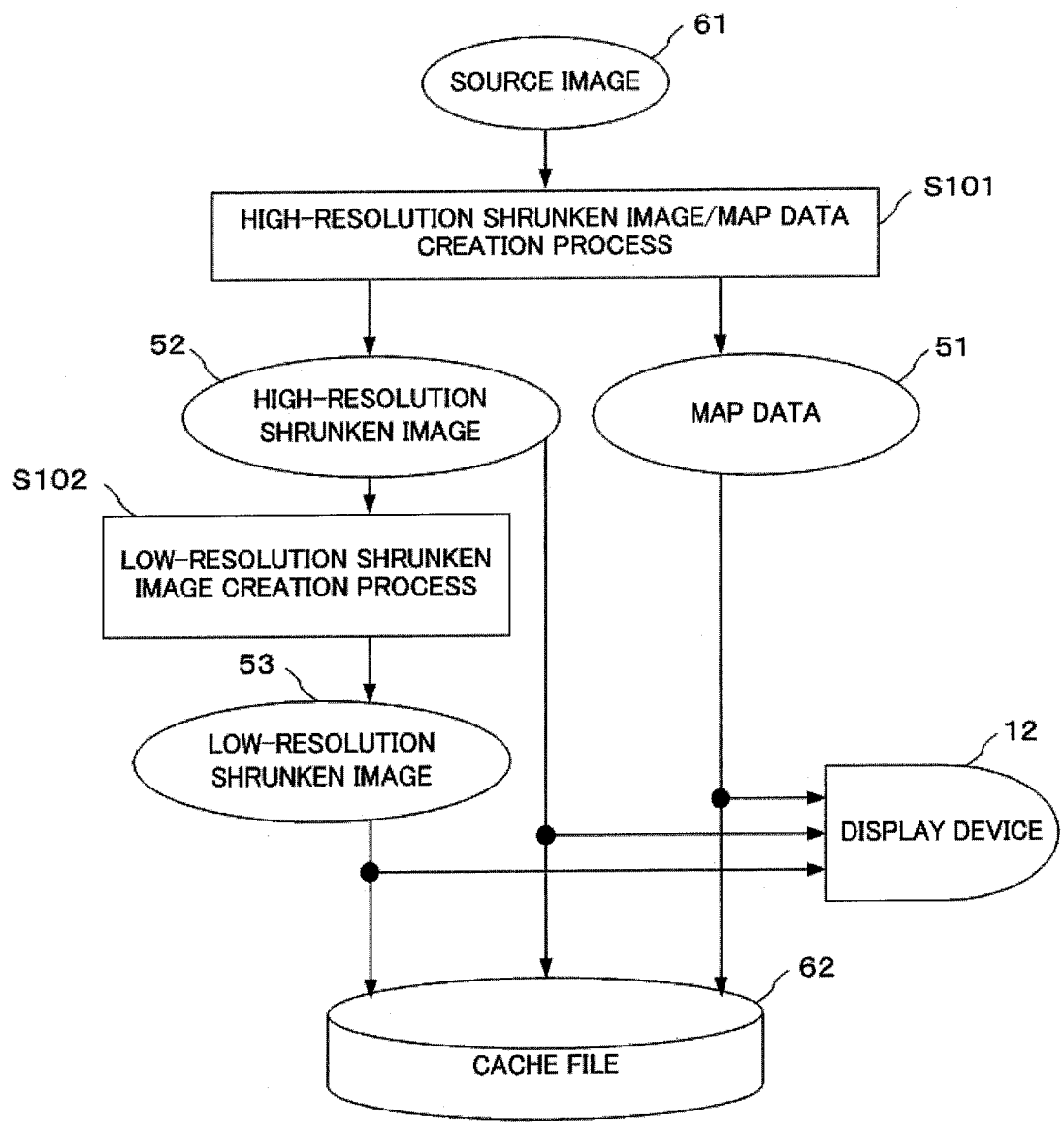
FIG. 9 is an explanatory drawing of operation outline of cache file creation unit 26 in FIG. 1.

In FIG. 9, cache file creation unit 26 simultaneously creates (in a single decode process) both high-resolution shrunken image 52 and map data 51 from source image (encoded image) 61 by using high-resolution shrunken image/map data creation process (S101). Further, low-resolution shrunken image creation process (5102) creates low-resolution shrunken image 53 from the high-resolution shrunken image. This map data 51, high-resolution shrunken image 52, and low-resolution shrunken image 53 are output to cache file 62 after these images are used for display output if a user requests the image to be displayed on display image 61.

(Sample Implementation of Cache File Creation)

Next, cache file creation process is described using JPEG format image as an example.

Figure 10:
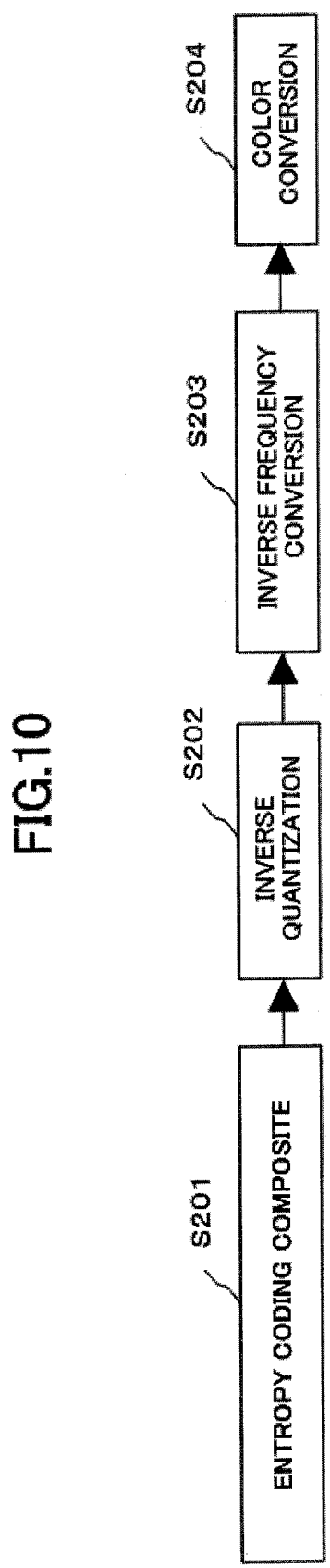
FIG. 10 is an explanatory drawing of a general JPEG data decode method.

To take advantage of the JPEG format in high-resolution shrunken image creation, not all frequency bands are decoded, but only certain low frequency band data being lower than a predetermined frequency are used to speed up the processing. Generally, JPEG data decoding is performed by steps indicated in FIG. 10.

In this diagram, entropy coding composite (S201) is a process to restore data from an encoded bitstream. For JPEG, Huffman coding is used for entropy encoding, and this process will be the decoding process for Huffman coded data. Afterwards, inverse quantization is performed (S202) to restore frequency data. Frequency data becomes YUV color space data (S203) through inverse frequency conversion (inverse DCT for JPEG). Afterwards, color conversion is performed (S204) to meet the color space (for example RGB) of display device 12, and decoding process is complete.

The high-resolution shrunken image created is stored again in JPEG format. This reduces data volume. At this time, there is no need to perform inverse frequency conversion on all frequency bands. Therefore, only performing inverse frequency conversion on the low frequency bands necessary depending on the shrunken image size enhances processing speed. Also, map data 51 is created when entropy coding is composited.

Figure 11:
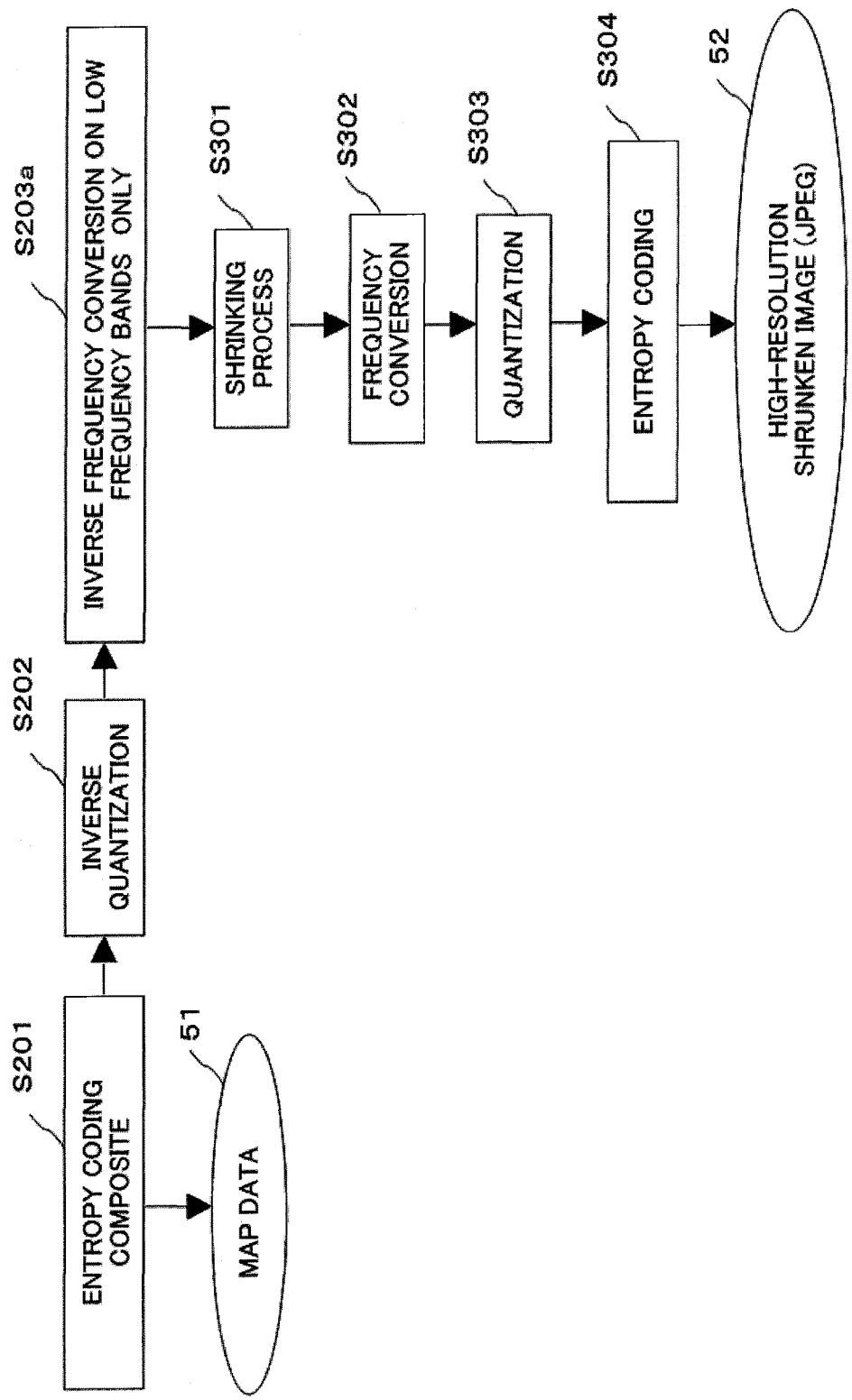
FIG. 11 is an explanatory drawing of simultaneous creation of high resolution shrunken image and map data in cache file creation unit 26 of FIG. 1.

FIG. 11 indicates creation steps for high-resolution shrunken image and map data.

Cache file creation unit 26 creates map data 51 when entropy coding is composited (S201) from encoded bitstream of encoded image. After step S201, inverse quantization (S202) is performed, and then inverse frequency conversion (S203a) is performed on low frequency bands. Further, it is preferable in step S203a to prepare a table of relation values between display size and frequency band (scan number) where inverse frequency conversion is performed, and refer to the table to extract frequency bands that correspond to display size to perform inverse frequency conversion.

After step S203a, shrinking process (S301), frequency conversion (S302), quantization (S303), entropy coding (S304) are performed to create high-resolution shrunken image 52 in JPEG format.

(Cache File Creation Timing)

Cache file 62 creation process is performed during idle periods between user control requests as described above. At this time, to achieve a smoother image viewing, importance is placed on deciding which images to create cache file for, and the order of cache file creation.

In this embodiment, cache file 62 is created in a different order depending on the user control request mode, namely the individual display mode where a selected image is displayed, and the thumbnail index mode where multiple images are displayed.

Figure 12:
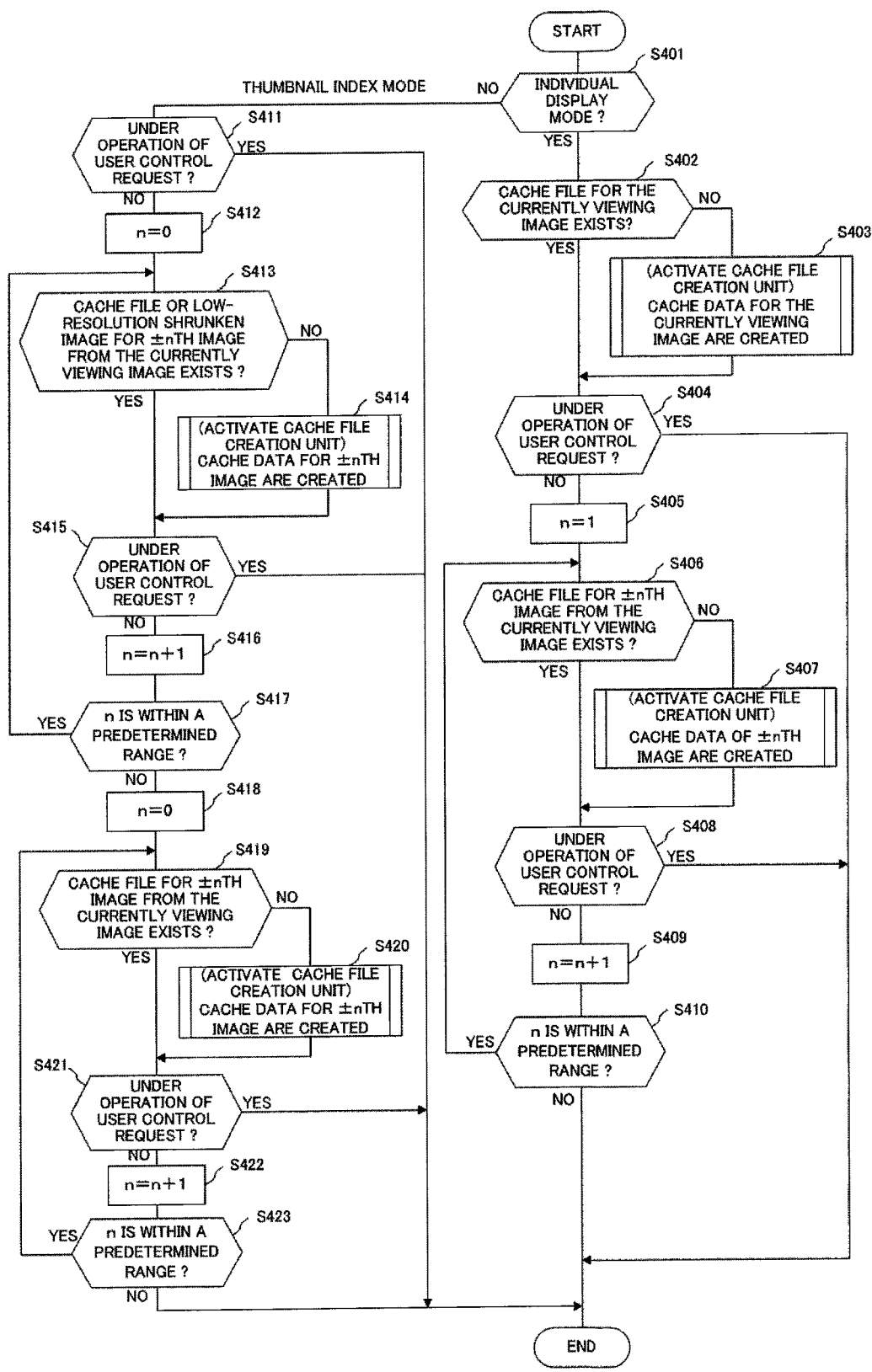
FIG. 12 is a flowchart that describes cache data creation timing of cache file creation control unit 25 in FIG. 1.

Below, FIG. 12 is used to describe cache file creation control unit 25.

When cache file creation control unit 25 is activated periodically or by activation command from control request input unit 24, the cache file creation control unit 25 first determines whether current control request mode is in individual display mode or not (S401).

According to this result, if the current control request mode is the individual display mode ("Yes" in S401), then cache file creation control unit 25 first determines whether cache file 62 exists for the currently viewing image (S402). If there is no cache file 62 for the currently viewing image, then cache file creation control unit 25 activates cache file creation unit 26, and first create cache data 50 for the image (S403). This cache file creation unit 26 outputs the created cache data 50 to display device 12, then writes the cache data 50 to cache file 62 of secondary memory 60.

Next, cache file creation control unit 25 determines whether or not a user is in mid-operation through GUI of input device 11 (S404). Here, after user control request input is recognized, the time period where this control request is still processing is considered to be in mid-operation of device.

If cache data 50 is created during device operation, then the response to control requests would be delayed, and it would end up interfering with smooth operations of viewing. Therefore cache file creation control unit 25 terminates without creating cache data ("Yes" in S404) during device operation. On the other hand, while a user is not performing control requests, cache file creation control unit 25 determines whether cache file 62 exists for images right before and right after the current image ID being viewed (S406), and if the corresponding cache file 62 does not exist, cache file creation unit 26 is activated, cache data 50 is created, and created cache data 50 is written to cache file 62 in secondary memory 60 (S407).

Next, if there is no user control request ("No" in S408), cache file creation control unit 25 performs similar process (S406-S409) on images adjoining the images of which the cache files have been created. Therefore, cache file 62 is created (S410) by repeating S406-S409 processes while existence of user control request is confirmed each time, for each image within a certain range of image obtaining order from the currently viewing image.

In thumbnail index mode, cache file creation order differs from that of individual display mode. This is due to the fact that if low-resolution shrunken image already exists it is just necessary to display the corresponding image, and therefore, its creation priority can be lowered. Below, thumbnail index mode cache file creation control unit 25 process steps are described.

In thumbnail index mode, cache file creation control unit 25 first determines whether user is currently operating the device (S411), if the user is currently operating, cache data creation is not performed. On the other hand, if user is not currently operating the device ("No" in S411), then cache file creation control unit 25 determines whether cache file or low-resolution shrunken image is already stored (S412, S413). If cache file or low-resolution shrunken image is stored ("Yes" in S413), in this step cache file is not created. If neither the cache file nor the low-resolution shrunken image is stored ("No" in S413) then cache file creation control unit 25 activates cache file creation unit 26, cache file 50 is created and is written to cache file 60 (S414). Next, if there are no user control requests ("No" in S415), cache file creation control unit 25 performs the same processes (S413, S414) on images adjoining the images of which the cache files have been created. Therefore, cache file 62 is created (S417) by repeating S413-S416 processes while existence of user control request is confirmed each time, for each image within a certain range of image obtainment order from the currently viewing image.

After step S417, cache file creation control unit 25 determines whether cache file of current image is stored, if the cache file is not stored, cache file creation unit 26 is activated to create cache file (S418-S420). At this step, even if low-resolution shrunken image exists, but if cache file does not exist, cache file is created. Next, if there is no user control request ("No" in S421), cache file creation control unit 25 performs the same processes (S419-420) on images adjoining the images of which the cache files have been created. Therefore, cache file 62 is created (S423) by repeating S419-S422 processes while existence of user control request is confirmed each time, for each image within a certain range of image obtainment order from the currently viewing image.

<Cache File Deletion Process>

Cache file 62 creation steps are as described above; however, creating cache file 62 for all images and storing them in secondary memory 60 uses significant amount of memory.

Therefore, cache file deletion unit 32 deletes unnecessary cache files if the number of cache files or cache files data volume total sum exceeds certain threshold value Sc. This determination is made immediately after each cache file creation where cache file deletion unit 32 is activated by cache file creation unit 26. The number of cache files increases only when cache data is created. Once cache file deletion unit 32 determines to delete cache file, deletion continues until the number of cache files or cache total file volume sum is below predetermined threshold Sc'(<Sc). The cache file deletion order is indicated below; however, in some cases the cache file created immediately before this cache file deletion may become the next cache file targeted to be deleted. In this case, the cache file is not deleted and cache file creation is terminated. However, in this case, when an image is displayed before or after the current image, the cache file creation status is reset to start the creating.

The cache file deletion order of cache file deletion unit 32 first deletes images that are outside the specific range from the current image. The range can be defined arbitrarily, for example, it is possible to assign consecutive numbers when encoded images are registered, and to determine the numbers that are removed more than a certain number to be outside the range. Another method is to assign categories to encoded images and if the currently displayed image belongs to the same category then the images of the same category are within the range, but if images belong to a different category, such images are outside of the range.

Cache file deletion unit 32 deletes files outside of the range, starting with the oldest creation date, and after all the images outside of the range are deleted, images within the range start being deleted. Cache file deletion unit 32 deletes images that are the furthermost located from the current image. A cache file deletion order is described in FIG. 13. For example, priority of image deletion for images that are outside of the range from the current image and have old cache file creation timestamp are assigned higher deletion priority compared to other images.

<Encoded Image Display Process>

Next, steps of decoding encoded image and output to display device 12 are described.

When a user requests a screen control requests, control request input unit 24 notifies that there was a control request to cache file creation control unit 25. Cache file creation control unit 25 halts activation of cache file creation unit 26 until control request process is completed.

Also, control request input unit 24 activates both shrunken image output unit 27 and partially decoded image output unit 30, and passes operation mode (individual display mode, thumbnail index mode), and control request information such as displayed image ID, scroll direction, scroll speed, and zoom in/out to the shrunken image output unit 27 and partially decoded image output unit 30.

Shrunken image output unit 27 is activated by control request input unit 24 and reads cache data 50 from cache file 62 for the image ID of image to be displayed. The read cache data is stored in main memory 40.

Next, shrunken image output unit 27 determines operation mode, and outputs low-resolution shrunken images of cache data 50 to the display if the operation mode is thumbnail index mode.

On the other hand, in individual display mode, shrunken image output unit 27 determines display area of high-resolution shrunken image from the control request information, and outputs image data of the display area determined by display processing unit 31 to display device 12. Specifying the display area is achieved using existing technologies, for example if top left corner of high-resolution shrunken image is the coordinate origin (0, 0), then the diagonally opposite corners of the rectangular display area (hereinafter called "diagonally opposite coordinate") are indicated as (x1, y1) (x2, y2), and the area data indicated in this style is passed to display device 12.

Next, shrunken image output unit 27 activates used block determination unit 28. When used block determination unit 28 is activated, IDs of macroblocks included in the display area are calculated.

Figure 14:
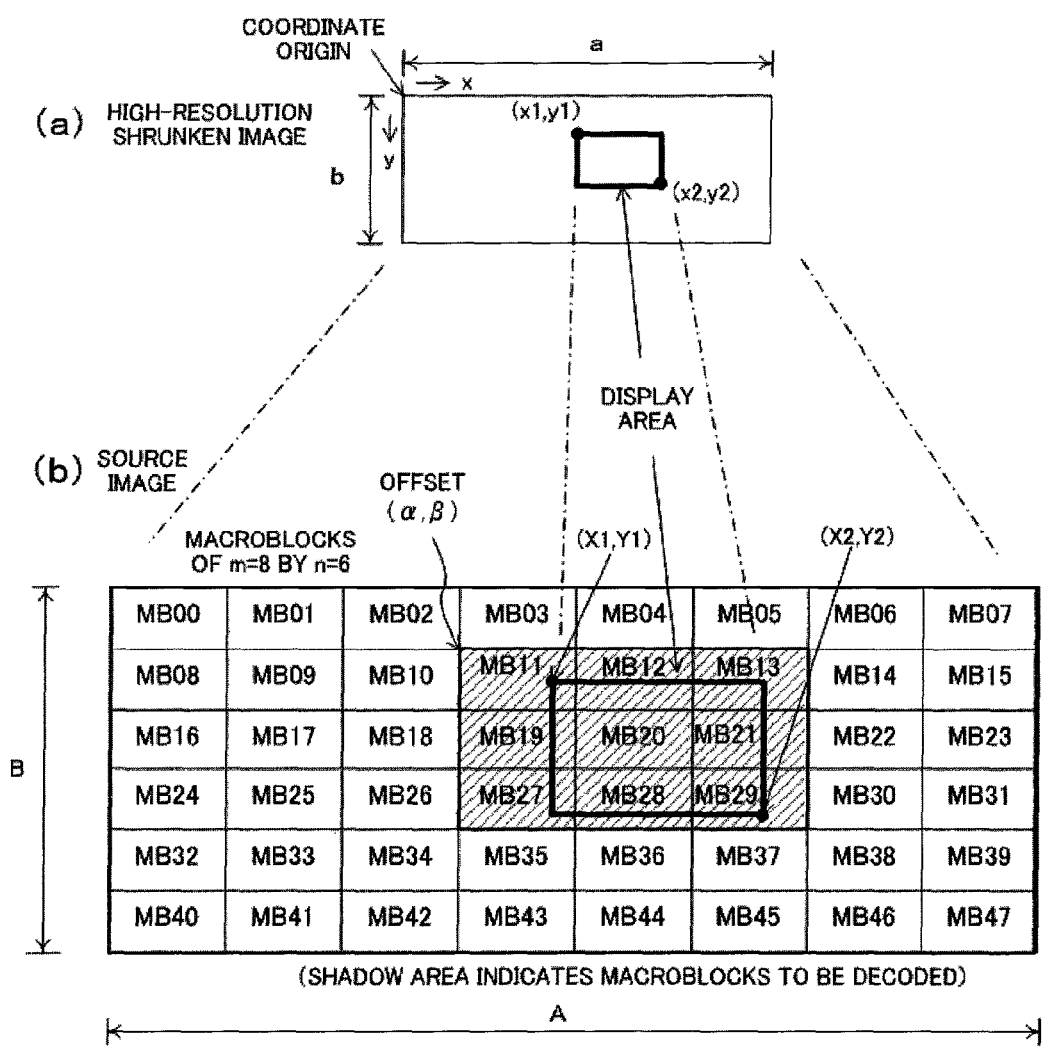
FIG. 14 is an explanatory drawing showing relationship between the high-resolution shrunken image and the source image display area.

One example of this calculation method is described using FIG. 14. FIG. 14($a$) indicates high-resolution shrunken image and its display area, and FIG. 14($b$) shows both the source image divided into macroblocks and the display area. For example, high-resolution shrunken image size is a by b pixels, and there are m by n source image blocks, then the macroblock ID corresponding to the high-resolution shrunken image coordinate (x, y) can be determined using the following formula.

$$\text{Macroblock ID}=<m*x/a>+m*<n*y/b> \quad (2)$$

Here $<v>$ is the largest integer that is v or less.

Above formula (2) is the formula when macroblock ID has initial value of '0' and the ID is ordered consecutively from the top left to the bottom right.

For example, if high-resolution shrunken image size is 1024 by 768 pixels, and the diagonally opposing coordinates of the rectangular display area are (x1, y1) (500, 200) and (x2, y2) (750, 500), then from the formula (2) above (x1, y1) macroblock ID is '11' and (x2, y2) macroblock ID is '29'. Similarly macroblock IDs of other vertices are obtained, and macroblock ID increases by 1 horizontally and by m vertically; therefore all macroblock IDs included in the rectangular display area can be determined. Used block determination unit 28 stores macroblock IDs belonging to rectangular display area to buffer 2 (42) of main memory 40. Afterwards, used block determination unit 28 activates partial decode unit 29.

After partial decode unit 29 is activated, encoded image 61 is partially decoded by utilizing map data of macroblocks having IDs recorded in buffer 2 of encoded image map data 51. Partially decoded image data is stored in buffer 1 (41) of main memory 40. Partial decode unit 29 activates partially decoded image output unit 30 after decoding process of macroblocks having IDs stored in buffer 2 (42) is completed.

After partially decoded image output unit 30 is activated, image part included in display area of partially decoded image data stored in buffer 1 (41) is output to display device 12.

One example of a coordinate conversion is described in FIG. 14. For source image size of A by B pixels, left top vertex is the coordinate origin, then the relations between coordinate (X, Y) and above high-resolution shrunken image coordinate (x, y) can be obtained with the following formulae.

$$X=(A/a)*x$$

$$Y=(B/b)*y$$

Therefore, if the top left vertex coordinate of partially decoded image is ($\alpha$, $\beta$), then the coordinate system with partially decoded image top left vertex as the coordinate origin is expressed as:

$$(X',Y')=((A/a)*x-\alpha,(B/b)*y-\beta) \quad (3)$$

Also, (α, β) can be obtained by the following formulae if macroblock ID is C.

$$\alpha = (A/m)*(C - m*<C/m>)$$

$$\beta = (B/n)*<C/m>$$

Here, <v> is the largest integer that is v or less.

With the above formula (3), partially decoded image that corresponds to high-resolution shrunken image display area can be displayed by converting the coordinate system of the rectangular display area of high-resolution shrunken image to the partially decoded image coordinate system.

With the above process, image data output from shrunken image output unit 27 or partially decoded image output unit 30 is output to display device 12 through display process unit 31.

According to this embodiment, after there is user control request input for individual display mode, high-resolution shrunken image is displayed first, then the encoded image is partially decoded and output to display device 12; therefore, partial decoding process is conducted smoothly without stressful user experience. Also, the entire encoded image does not have to be decoded upon user control request; therefore, memory resources are conserved.

The above coordinate conversion using formulae (2) and (3) are merely examples, and this invention is not limited to these methods.

Figure 15:
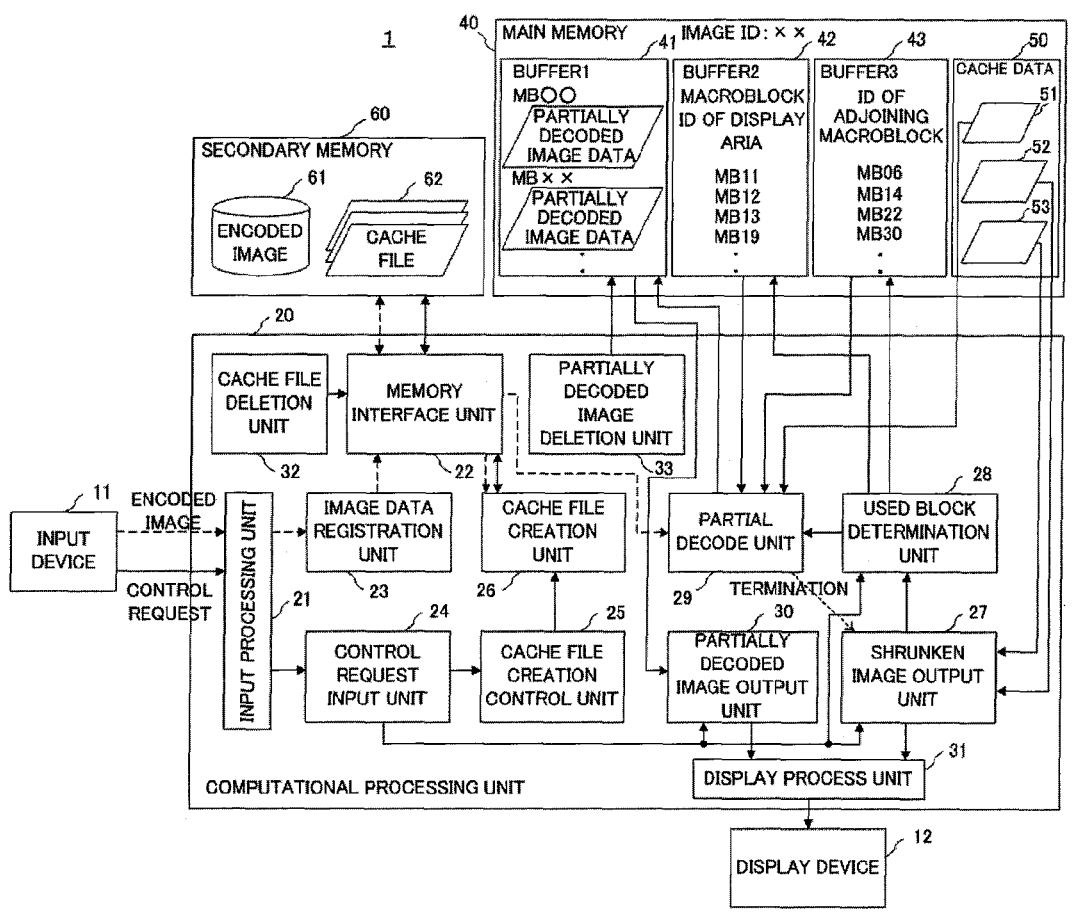
FIG. 15 is a functional block diagram of the image processing apparatus of the second embodiment of this invention.

Next, the second embodiment of this invention is described. This embodiment effectively utilizes partially decoded image in main memory to quickly respond to user control requests. FIG. 15 is the functional block diagram of the image processing apparatus to realize partial image expansion method of the second embodiment. The main difference from the image processing apparatus 1 of FIG. 1 is the addition of partially decoded image deletion unit 33 to delete partially decoded image in main memory, and the change to high-resolution shrunken image output process of shrunken image output unit 27 to allow receiving termination request of display output process by receiving process termination request from partial decode unit 29.

This embodiment also includes buffer 1 to store in main memory 40 macroblock IDs and their partially decoded image data that are currently being used, buffer 2 to store macroblock IDs that correspond to the current display area of the high-resolution shrunken image, and buffer 3 to store macroblock IDs of macroblocks adjoining the buffer 2 macroblocks but are outside of current display area.

Other features are the same as in FIG. 1, and the identical features are described using the same symbols so they will not be further described thereafter.

What is described next is the operation of image processing apparatus 1 of the above system structure.

When there is control request input, used block determination unit 28 activated by shrunken image output unit 27 stores macroblock IDs corresponding to the current display area to buffer 2 of main memory 40, and partial decode unit 29 is activated. Then, after partial decoding process, macroblock addition routine described below is executed.

After partial decode unit 29 is activated, macroblock IDs stored in buffer 2 are extracted. Next, whether all macroblock IDs of buffer 2 exist is determined in buffer 1, and if all macroblock IDs exist, then termination command is output to terminate high-resolution shrunken image display output process in shrunken image output unit 27. Therefore, shrunken image output unit 27 terminates display output process for high-resolution shrunken image.

On the other hand, if even a single macroblock ID is missing amongst all the macroblock IDs, partial decode unit 29 does not output termination command to shrunken image output unit 27. The missing macroblock ID blocks are partially decoded and added to buffer 1. After decoding all missing macroblocks, partially decoded image output unit 30 is activated. Operation of partially decoded image output unit 30 is the same as in the first embodiment.

Figure 16:
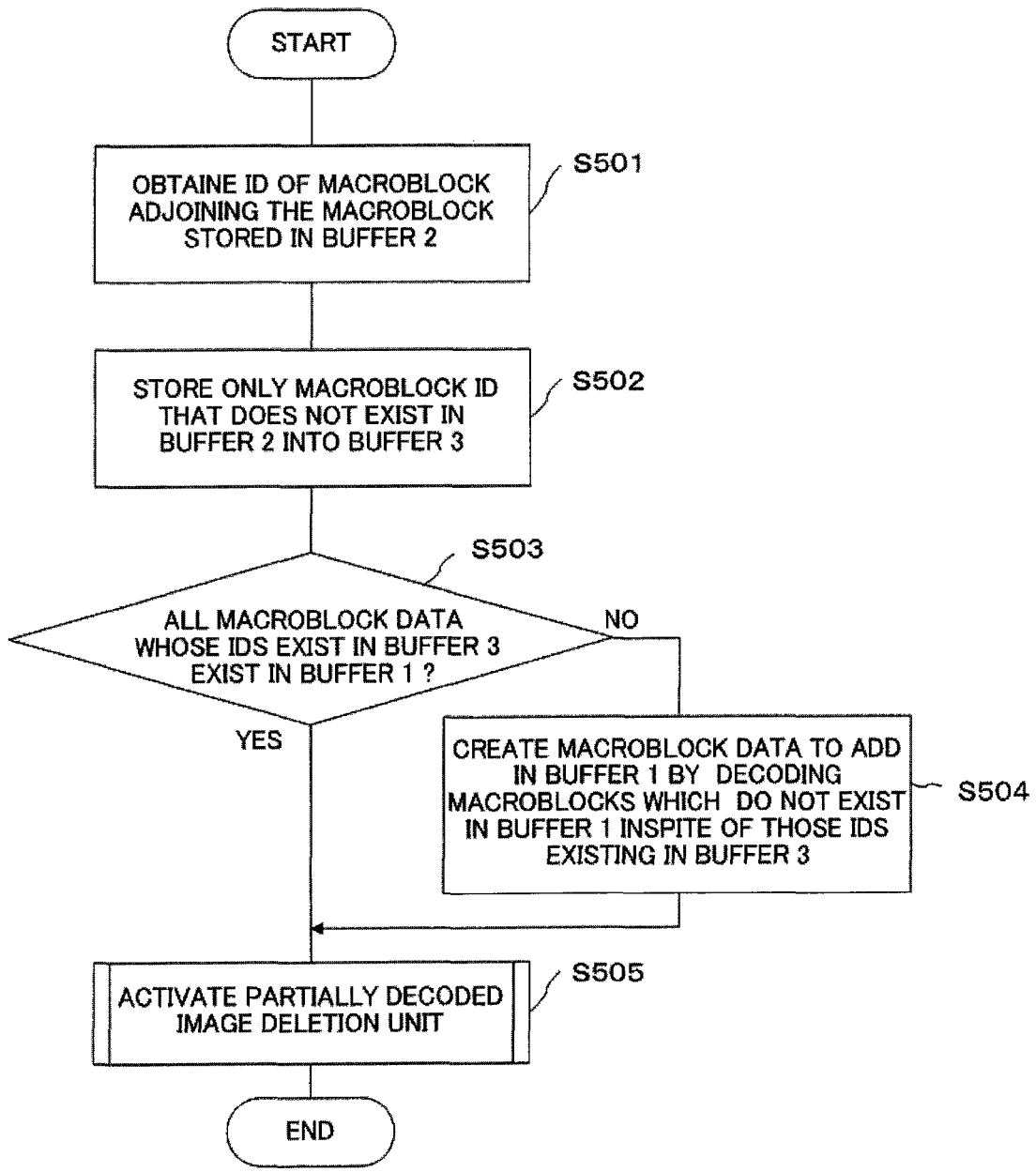
FIG. 16 is a flowchart of procedure of macroblock addition routine of used block determination unit 28 in FIG. 15.

Next, FIG. 16 is used to describe the macroblock addition routine executed by used block determination unit 28.

After macroblock addition routine is activated, IDs of macroblocks adjoining the macroblocks stored in buffer 2 are obtained (S501), and buffer 3 only stores macroblock IDs that are not stored in buffer 2 (S502).

Then, macroblock IDs stored in buffer 3 are extracted, and whether macroblocks of the extracted macroblock IDs exist in buffer 1 is determined (S503), if the macroblocks do not exist, partial decode unit 29 is used to partially decode blocks belonging to those macroblock IDs and they are added to buffer 1 (S504). After step S504 is completed for all macroblock IDs in buffer 3, partially decoded image deletion unit 33 is activated.

Figure 17:
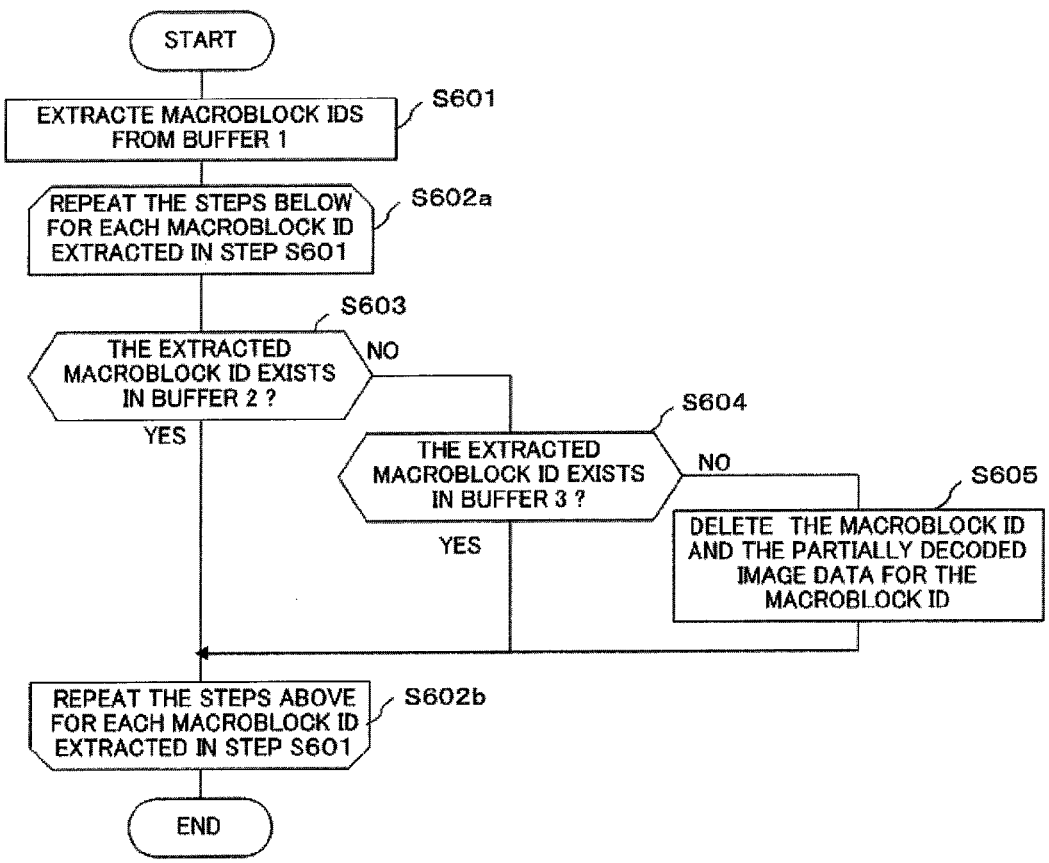
FIG. 17 is a flowchart of process steps of partially decoded image deletion unit 33 in FIG. 15.

With reference to FIG. 17, after partially decoded image deletion unit 33 is activated, the first macroblock ID is extracted from buffer 1 (S601), whether the extracted macroblock ID exists in buffer 2 is determined (S603), if such macroblock ID does not exist, whether such macroblock ID exists in buffer 3 is determined (S604), if such macroblock ID does not exist, the corresponding macroblock ID and the partially decoded image data for the macroblock ID are deleted (S605). Steps S603-S605 for all macroblock IDs extracted in step S601 are repeated (S602a, S602b).

For task processing, partially decoded image deletion unit 33 has lower priority than other units such as used block determination unit 28, partial decode unit 29, and partially decoded image output unit 30. This allows for control requests to activate other units that take precedence over and even interrupts partially decoded image deletion unit 33 even when it is active.

According to this embodiment, since partially decoded image data that is being currently displayed is always stored in main memory, and adjoining blocks are prepared in advance, it is possible to realize quick displays of more detailed partially decoded images in response to control requests such as scrolling. Also, since high-resolution shrunken images are displayed when processing becomes delayed, it is possible to realize more effective image display than that in the first embodiment. Further, since partially decoded image data of macroblocks that are positioned far from the currently displayed macroblocks are consecutively deleted rather than deleting adjoining macroblocks, main memory can be effectively used.

When adjoining macroblocks are decoded, for a zoom-out control request on an image, all adjoining macroblocks are decoded, and for scrolling control request only adjoining macroblocks that are in the scrolling direction can be decoded. This is a more effective use of main memory and allows for effective predictive decoding process.

Figure 18:
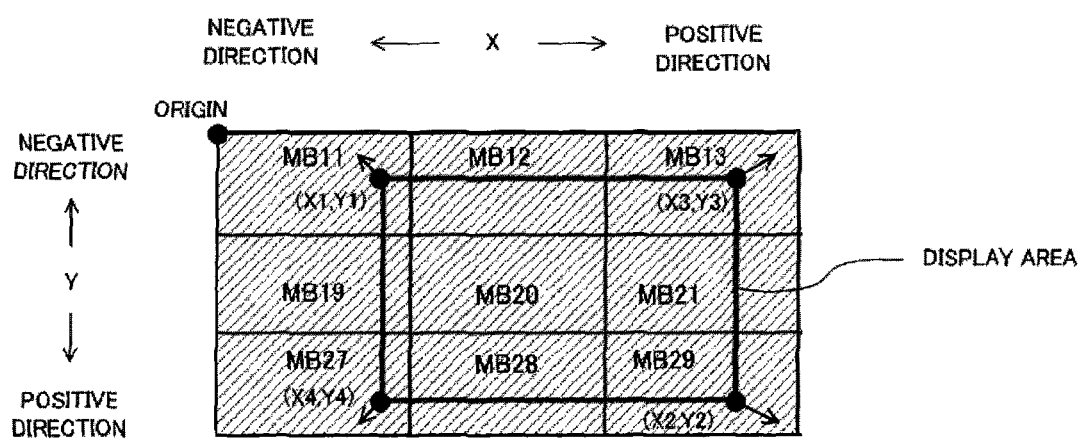
FIG. 18 is an explanatory drawing of movement of display area of partially decoded image data according to user control request.
Figure 19:
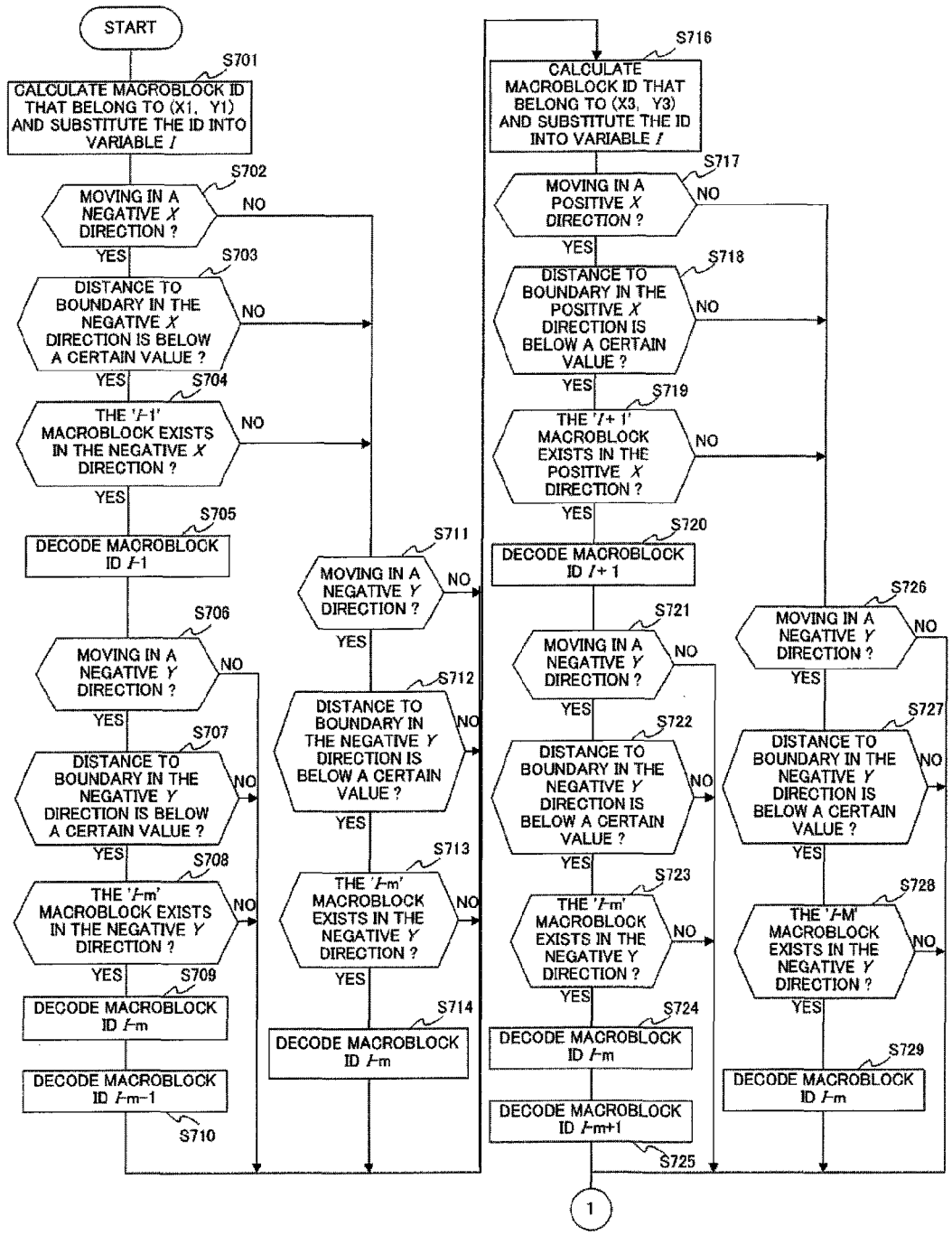
FIG. 19 is a flowchart of process steps of used block determination unit 28 of another embodiment (part 1) in FIG. 15.
Figure 20:
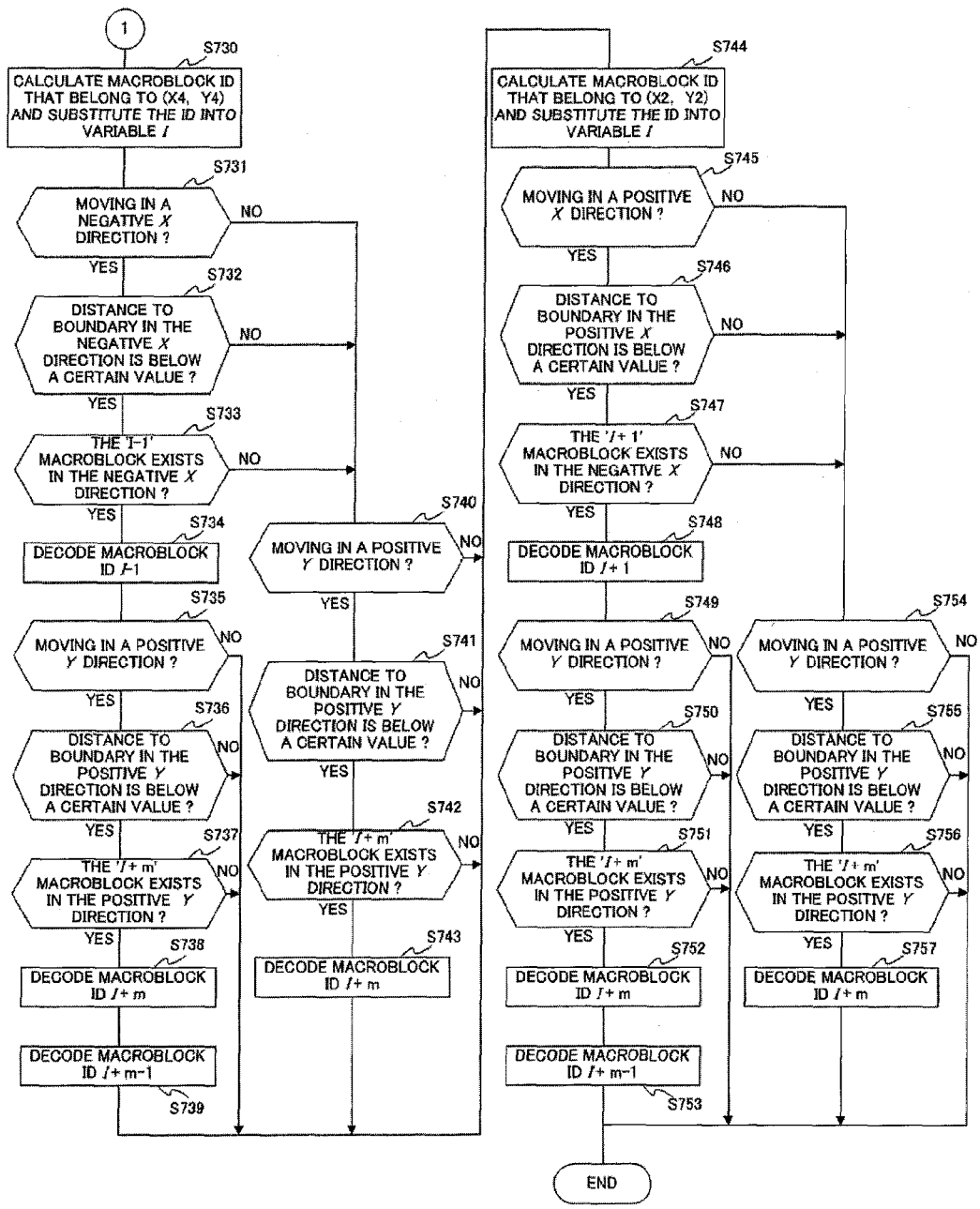
FIG. 20 is a flowchart of process steps of used block determination unit 28 of another embodiment (part 2) in FIG. 15.

One example of predictive decoding steps in used block determination unit 28 is indicated in FIG. 19 and FIG. 20. These example steps, as indicated in FIG. 18, are to decode adjoining macroblocks that are in the direction of vertex movement if the distance between each vertex and image boundary of macroblocks satisfies certain conditions.

Example of top left vertex (X1, Y1) is further described here. Used block determination unit 28 calculates macroblock ID that belong to (X1, Y1) using above formula (2) and substitutes the calculated ID into variable I (S701). Then according to the control request information passed by control request input unit 24, if the vertex is moving in a negative X direction ("Yes" in S702), then whether distance between display area vertex coordinate (X1, Y1) and image boundary in the negative X direction of macroblock where the vertex belongs is below a certain value is determined (S703). If such distance is below a certain value ("Yes" in S703), then whether the 'I−1' macroblock exists in the negative X direction is determined (S704). In other words, whether macroblock belonging to (X1, Y1) is in the left edge is determined. This can be obtained from macroblock division condition (m by n) and current macroblock ID, and can also be obtained by storing geometric array information as indicated in FIG. 2. With this determination result, if I−1 macroblock exists in the negative X direction ("Yes" in S704), then partial decode unit 29 is activated and macroblock ID I−1 is decoded (S705).

Next, similar to above, used block determination unit 28 determines whether there is movement on the Y axis in the negative direction (S706), and determines whether the distance between the current display area vertex coordinate (X1, Y1) and the negative Y direction boundary of macroblock containing the vertex is equal or less than a certain value (S707). If such distance is equal to or less than a certain value, whether I−m macroblock exists in the negative Y direction is determined (S708). In other words, whether the macroblock containing the current (X1, Y1) is the upper edge or not is determined. With this determination result, if I−m macroblock exists in the negative Y direction ("Yes" in S708), partial decode unit 29 is activated, and macroblock ID 'I−m−1' is decoded (S710). This is due to the vertex (X1, Y1) moving in the upper left direction, and getting closer to a macroblock in a diagonal direction.

If the determination is No in step S702, step S703, or step S704, then go to step S711 and similar process as steps S706-S709 is executed.

Above is the macroblock predictive decoding process according to the movement of the upper left vertex in display area, and predictive decoding can be processed for upper right (X3, Y3), bottom left (X4, Y4), and bottom right (X2, Y2) vertices as well, as indicated by steps shown in FIG. 19 and FIG. 20.

With this predictive decoding process, since macroblocks that are outside the display area having high probability of being displayed are still decoded in advance, it is possible to improve response times in addition to the effects of the above embodiment.

The present invention is not limited to the above embodiments, as it can be realized in various forms that are not beyond the scope of this summary. Also, each feature (unit) described in each embodiment can be realized individually or in combination with various embodiments.

What is claimed is:

1. A method for partially expanding an image encoded on a macroblock basis utilizing a computer, comprising the following steps of:
   (a) storing, in a storage device of the computer, the encoded image, map data created from bitstream of the encoded image, the map data being utilized to decode at least one macroblock of the encoded image, and a shrunken image created from the encoded image so as to relate the map data and the shrunken image with the encoded image;
   (b) outputting, to a display device, the shrunken image related with the encoded image to be displayed based on a control request received from an input device;
   (c) determining at least one macroblock to be decoded based on a display area of the shrunken image;
   (d) partially decoding the encoded image for the determined macroblock using the map data; and
   (e) outputting to the display device, the partially decoded image of the display area so that the shrunken image displayed on the display area is replaced by the output partially decoded image.

2. The method according to claim 1,
wherein in the step (a), the map data and the shrunken image are created during idle periods.

3. The method according to claim 1,
further comprising a step of creating map data and a shrunken image of an image adjoining the image of which the map data and the shrunken image have been created within a certain range of image obtaining order from a currently viewing image.

4. The method according to claim 1,
further comprising a step of partially decoding macroblocks adjoining the partially-decoded macroblocks corresponding to the current display area.

5. The method according to claim 1,
further comprising a predictive decoding step of adding macroblock(s) to be partially decoded based on a screen control request.

6. The method according to claim 5,
further comprising a step of determining whether the partially decoded image to be output to the display device exists, and when such a partially decoded image exists, a step of terminating the step (b) for outputting the shrunken image.

7. The method according to claim 1,
wherein the step (e) is not performed when processing becomes delayed due to the control request.

8. The method according to claim 1,
wherein, while a user is operating, the creating of the map data and the shrunken image is terminated.

9. The method according to claim 1,
further comprising a step of creating a shrunken image of an image adjoining the image of which the shrunken image have been created within a certain range of image obtaining order from a currently viewing image in thumbnail index mode where multiple images are obtained.

10. An image processing apparatus comprising:
an input device to input image data and a control request;
a computational processing device to perform computational processing on the input image data;
a display device to display processing results for images;
a storage device to store an encoded image, map data created from bitstream of the encoded image, the map data being utilized to decode at least one of macroblock of the encoded image, and a shrunken image created from the encoded image so as to relate the map data and the shrunken image with the encoded image,
wherein the computational processing device comprises:
   a shrunken image output unit which outputs, to the display device, the shrunken image related with the encoded image to be displayed when a control request is received from the input device;
   a used block determination unit which determines at least one macroblock to be partially decoded based on a display area of the shrunken image;
   a partial decoding unit which partially decodes the encoded image for the determined macroblock using the map data; and
   a partially decoded image output unit which outputs the partially decoded image of the display area created by the partial decoding unit to the display device so that the shrunken image displayed on the display area is replaced by the output partially decoded image.

11. The image processing apparatus of claim 10, wherein the computational processing device further comprises a cache file creation unit which creates the map data and the shrunken image stored in the storage device.

12. The image processing apparatus of claim 11, wherein the cache file creation unit creates the map data and the shrunken image during idle periods.

13. The image processing apparatus of claim 11, wherein the cache file creation unit creates map data and a shrunken image of an image adjoining the image of which the map data and the shrunken image have been created within a certain range of image obtaining order from a currently viewing image.

14. The image processing apparatus of claim 11, wherein, while a user is operating, an operation of the cache file creation unit is terminated.

15. The image processing apparatus of claim 11, wherein the cache file creation unit creates a shrunken image of an image adjoining the image of which the shrunken image have been created within a certain range of image obtaining order from a currently viewing image in thumbnail index mode where multiple images are obtained.

16. The image processing apparatus of claim 10, wherein the partial decoding unit further partially decodes macroblocks adjoining the partially-decoded macroblocks corresponding to the current display area.

17. The image processing apparatus of claim 10, wherein the used block determination unit performs a predictive decoding process of adding macroblock(s) to be partially decoded based on a screen control request.

18. The image processing apparatus of claim 17, wherein the partially decoded image output unit determines whether the partially decoded image to be output to the display device exists, and when such a partially decoded image exists, an operation of the shrunken image output unit is terminated.

19. The image processing apparatus of claim 10, wherein an operation of partially decoded image output unit is not performed when processing becomes delayed due to the control request.

20. A non-transitory computer readable medium containing a program for partially expanding an image encoded on a macroblock basis, the program executed on a computer which has a storage device to store an encoded image, map data created from bitstream of the encoded image, the map data being utilized to decode at least one of macroblock of the encoded image, and a shrunken image created from the encoded image so as to relate the map data and the shrunken image with the encoded image, the program comprising the following steps of:

(a) outputting, to a display device, the shrunken image related with the encoded image to be displayed based on a control request received from an input device;

(b) determining at least one macroblock to be decoded based on a display area of the shrunken image;

(c) partially decoding the encoded image for the determined macroblock using the map data; and (d) outputting to the display device, the partially decoded image of the display area so that the shrunken image displayed on the display area is replaced by the output partially decoded image.

* * * * *